US008732623B2

(12) United States Patent
Liang et al.

(10) Patent No.: US 8,732,623 B2
(45) Date of Patent: May 20, 2014

(54) WEB CAM BASED USER INTERACTION (75) Inventors: Xiao Liang, Beijing (CN); Xin Zou, Beijing (CN); Weiwei Zhang, Beijing (CN); Shuo Wang, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 12/372,446

(22) Filed: Feb. 17, 2009

(65) Prior Publication Data

US 2010/0211918 A1 Aug. 19, 2010

(51) Int. Cl.
G06F 3/033 (2013.01)
G06F 3/00 (2006.01)

(52) U.S. Cl.
USPC .......................................... 715/863; 715/865

(58) Field of Classification Search
USPC .................................. 382/202; 715/863, 865
See application file for complete search history.

(56) References Cited

U.S. PATENT DOCUMENTS

| 5,617,312 | A | * | 4/1997 | Iura et al. ........................ 700/83 |
| 5,625,704 | A | * | 4/1997 | Prasad ........................... 382/118 |
| 5,680,481 | A | * | 10/1997 | Prasad et al. .................... 382/190 |
| 6,111,580 | A | * | 8/2000 | Kazama et al. ................. 715/863 |
| 6,771,277 | B2 | * | 8/2004 | Ohba ............................. 345/629 |
| 7,095,401 | B2 | * | 8/2006 | Liu et al. ........................ 345/156 |
| 7,129,927 | B2 | * | 10/2006 | Mattsson ....................... 345/158 |
| 7,227,976 | B1 | | 6/2007 | Jung et al. |
| 7,435,177 | B1 | * | 10/2008 | Ford ................................ 463/30 |
| 2007/0098250 | A1 | * | 5/2007 | Molgaard et al. ............. 382/154 |
| 2008/0060033 | A1 | | 3/2008 | Xiao |
| 2009/0217210 | A1 | * | 8/2009 | Zheng et al. ................... 715/863 |
| 2010/0125816 | A1 | * | 5/2010 | Bezos ............................ 715/863 |

OTHER PUBLICATIONS

Harada et al., "VoiceDraw: A Hands-Free Voice-Driven Drawing Application for People With Motor Impairments" in Assets '07 Proceedings of the 9th inernational ACM SIGACCESS conference on Computers and accessibility, 2007, ACM, pp. 27-30.*
Belaroussi, et al., "Face Tracking and Facial Feature Detection with a Webcam", retrieved on Nov. 17, 2008 at <<http://ieeexplore.ieee.org/stamp/stamp.jsp?arnumber=04156019>>, Institute of Intelligent Systems and Robotics—PRC, University Pierre and Marie Curie, Paris France, pp. 122-126.
Cerezo, et al., "Real-Time Facial Expression Recognition for Natural Interaction", retrieved on Nov. 17, 2008 at <<http://dmi.uib.es/~ugiv/papers/44780040.pdf>>, IbPRIA 2007, Part II, LNCS 4478, Springer-Verlag Berlin Heidelberg, 2007, pp. 40-47.

(Continued)

Primary Examiner — Kieu Vu
Assistant Examiner — Aaron Lowenberger
(74) Attorney, Agent, or Firm — Carole Boelitz; Micky Minhas; Lee & Hayes, pllc.

(57) ABSTRACT

This document describes tools for inputting data into a computer via the movement of features of a user as detected by a webcam or other input device. This is accomplished by a user moving his or her features in view of a webcam. The webcam or other input device then detects the presence and motion of the feature(s) and converts these motions into input signals to execute predetermined input instructions.

19 Claims, 5 Drawing Sheets (56) References Cited

OTHER PUBLICATIONS

Lin, et al., "Manipulation of Remote 3D Avatar Through Facial Feature Detection and Real Time Tracking", retrieved on Nov. 17, 2008 at <<http://ieeexplore.ieee.org/stamp/stamp.jsp?arnumber=1237857&isnumber=27769>>, IEEE International Conference on Multimedia and Expo, 2001, pp. 1064-1067.

Manresa-Yee, et al., "Face-Based Perceptual Interface for Computer-Human interaction", retrieved on Nov. 17, 2008 at <<http://wscg.zcu.cz/wscg2006/Papers_2006/Short/E47-full.pdf>>, WSCG 2006, Jan. 30-Feb. 3, 2006, Plzen, Czech Republic, UNION Agency—Science Press, 7 pages.

McCabe, "A Software Face Tracker Using a Webcam", retrieved on Nov. 17, 2008 at <<https://www.cs.tcd.ie/Kenneth.Dawson-Howe/Projects/FYP2006_EoghanMcCabe.pdf>>, 2006, pp. 1-80.

Wang, et al., "Face Tracking as an Augmented Input in Video Games: Enhancing Presence, Role-Playing and Control", retrieved on Nov. 17, 2008 at <<http://research.microsoft.com/acid/FaceTrackingInGames.pdf>>, CHI 2006, Apr. 22-27, 2006, Montreal, Quebec, Canada, ACM, 2006, 10 pages.

\* cited by examiner

WEB CAM BASED USER INTERACTION

BACKGROUND

Computers have become an essential part of everyday life for many people. However, inputting information in a computer can be tedious and, for some, even painful. Specifically, some computer users experience painful medical issues from the repetitive action of typing on a keyboard.

In other cases it may be impossible to input data via a keyboard. For instance, a person who lacks full use of his or her hands may face significant obstacles inputting data via a keyboard. Thus, there is a need to input data via other means.

SUMMARY

This document describes tools for allowing a user to input data into a computer via movement of the user. For instance, the user may input data by moving his or her features (e.g., head, mouth, hands, arms, etc.) in view of a webcam or other input device. The webcam or other input device then detects presence and motion of the user and converts this detected movement into input signals to execute predetermined input instructions. In some instances, the tools accomplish these tasks without any remote control or sensing device attached to the user. These tools thus provide a novel method to write text characters, draw, control games, or otherwise perform actions that can supplement or replace inputs made via the traditional keyboard and mouse.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes tools for allowing a user to input data into a computer via movement of the user. For instance, the user may input data by moving his or her features (e.g., head, mouth, hands, arms, etc.) in view of a webcam or other input device. The webcam or other input device then detects the presence and motion of the user and converts this detected movement into input signals to execute predetermined input instructions. In some instances, the tools accomplish these tasks without any remote control or sensing device attached to the user. These tools thus provide a novel method to write text characters, draw, control games, or otherwise perform actions that can supplement or replace inputs made via the traditional keyboard and mouse.

In one embodiment, text characters or other free form drawings are created via body part movement. Specifically, character strokes are created via information from facial expressions and head movement. In this embodiment, the stroke starting point is created by the user opening his/her mouth. The direction, length and speed of the stroke is determined by the user's head movement (e.g., while keeping his/her mouth open). The endpoint of the stroke may be determined by the user closing his/her mouth.

Input created via user movement present several advantages over traditional input. First, traditional input requires a user to sit statically in a fixed position front of the computer with a keyboard and mouse. The described tools enable a user to input data from a distance in various positions without a keyboard and mouse. This provides the user the option to move about which reduces the risks of injury from repetitive movements. Second, this method allows different features of the user (e.g., mouth, face, arms, legs, etc.) to input data as opposed to simply hand input via keyboard and mouse. Specifically, head movement, facial expressions, eye blinking/movement and motions of other body parts can be used to create input, which may be beneficial for users who are unable to type or whose typing is otherwise limited.

The claimed tools, therefore, provide for a method to convert user movement into input data via a webcam.

The discussion begins with a section entitled "Illustrative Architecture," which describes one non-limiting environment that may implement the claimed tools. A second and final section, entitled "Illustrative Processes," describes a process for creating a text character illustrated in the architecture of FIG. 1 as well as other architectures. Again, this process is merely illustrative, as the claimed tools may allow the user to input any other form of input to the computing device.

This brief introduction, including section titles and corresponding summaries, is provided for the reader's convenience and is not intended to limit the scope of the claims, nor the proceeding sections.

Illustrative Architecture

Figure 1:
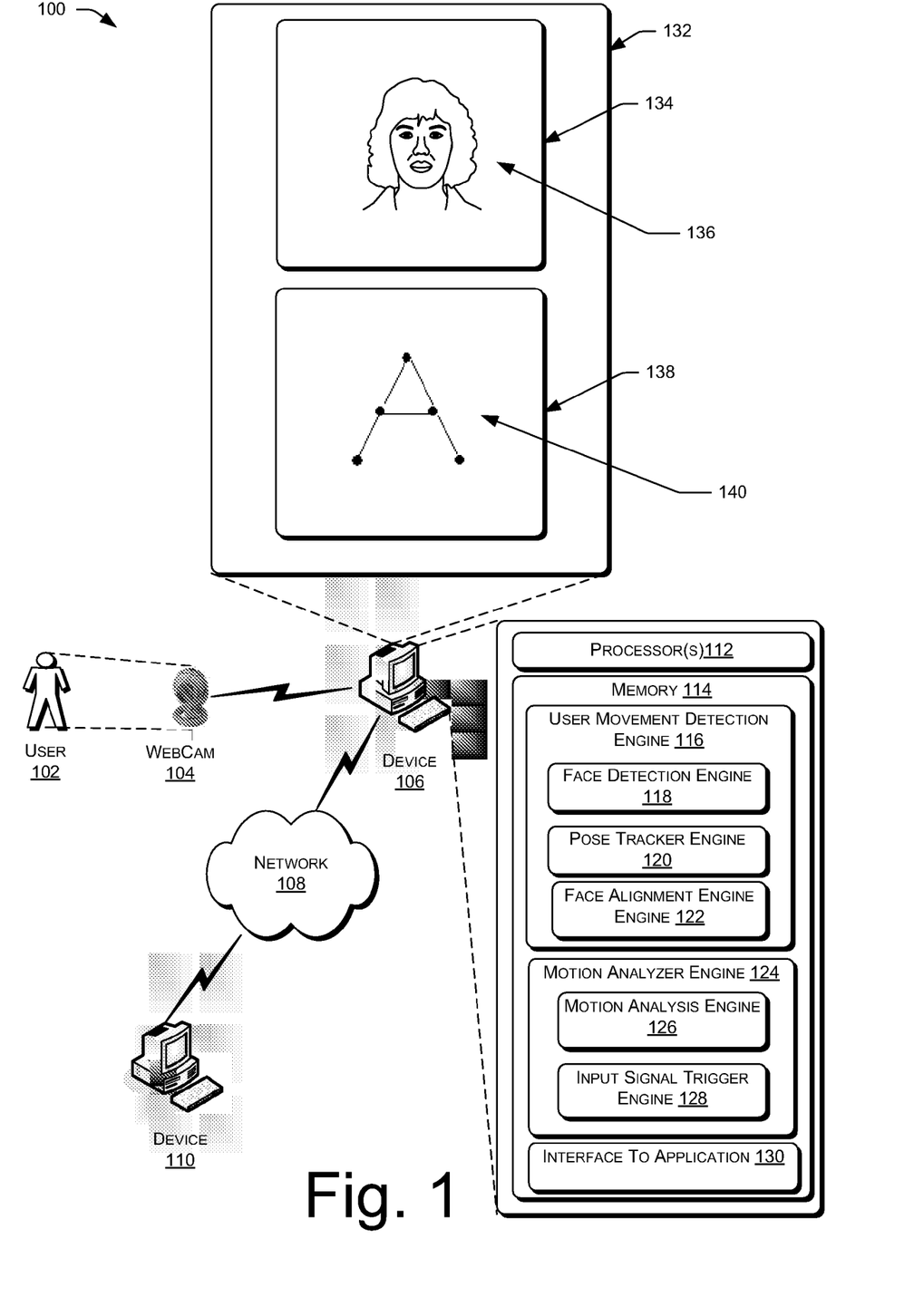
FIG. 1 depicts an illustrative architecture that includes a user movement detection engine and a motion analyzer engine used to create a text character or otherwise perform an action on a computing device.

FIG. 1 depicts an illustrative architecture 100 that may employ the described techniques. As illustrated, FIG. 1 includes one or more users 102 being monitored by webcam 104, which is in communication with a computing device 106. While FIG. 1 illustrates webcam 104, it is to be appreciated that other implementations may employ any other sort of visual or audio/visual input device. Webcam 104 monitors the user for movement, such as facial expressions, head movement or any other motion by a user. In other implementations, as opposed to webcam 104, architecture 100 may include any sort of device capable of detecting a user's motion. For instance, while webcam 104 may comprise a stand-alone webcam or a webcam integrated into a laptop screen, other implementations may employ a cell phone camera, a camcorder, a digital camera, or the like. Webcam 104 can be in communication with device 106 via wired or wireless connections.

Computing device 106, meanwhile, may comprise any sort of device capable of executing computer-executable instructions. For instance, the device may comprise a personal computer, a laptop computer, a mobile phone, a set-top box, a game console, a personal digital assistant (PDA), a portable media player (PMP) (e.g., a portable video player (PVP) or a digital audio player (DAP)), and the like.

Additionally, FIG. 1 illustrates network 108 and computing device 110. Note that network 108, which couples the computing devices 106 and 110, may comprise the Internet, a Local Area Network (LAN), a Wide Area Network (WAN), a wireless network, and/or the like. Similar to computing device 106, computing device 110, may comprise any sort of device capable of executing computer-executable instructions. In a like manner, computing device 110 can be used to send signals across network 108 to computing device 106.

In this non-limiting example, user 102 uses webcam 104 and computing device 106 to provide input to the device via detection of movement of the user. Once device 106 receives and detects this motion, device 106 converts that motion into specific signals and executes commands in response to those specific signals. In other embodiments, the method can be run on multiple devices locally, run remotely or run on a combination thereof. For instance, user 102 could additionally or alternatively provide input to computing device 110 over network.

As illustrated, device 106 includes one or more processors 112, as well as memory 114, upon which a user movement detection engine 116 may reside. User movement detection engine 116 initially serves to detect a user's face and/or other specified body parts. Once engine 116 detects the face, user movement detection engine 116 may also serve to determine the position, size, orientation and alignment of the user's face and/or other specified features of the user.

User movement detection engine 116 may include face detection engine 118 (which serves to detect a user's face or other body part), pose tracker engine 120 (which serves to determine face and/or body part position information from the face detection engine 118) and face alignment engine 122 (which aligns the user's face on the screen of device 106, facial features and/or other body parts). These engines will be elaborated on below.

The memory 114 can also host motion analyzer engine 124. This engine serves to record the user's movements in each frame and then analyze the motion. This engine may include motion analysis engine 126 (which records the position, rotation and other user motions). Engine 124 may also include an input signal trigger engine 128 (which sends input signals to external applications). In other embodiments, input signal trigger engine 128 may not be part of motion analyzer engine 124.

Finally, the memory 114 can host an interface to application 130. This engine serves to convey information from the input signal trigger engine 128 to external applications and also may be used to configure motion analyzer engine 124. For example, interface application may convey instructions for an external application to create a character stroke, execute another application or any number of tasks.

In the non-limiting architecture of FIG. 1, user 102 comes into view of webcam 104. Once a feature of user 102 (e.g. the face of user 102) is detected, the user creates motion via that feature. This may include the user creating a facial expression, head movement, blinking eyes, moving fingers, arms, legs, eyebrows, opening/closing a mouth or moving any other body part. The webcam 104 detects this motion and conveys the motion data to device 106. As mentioned above, device 106 serves to host user movement detection engine 116, motion analyzer engine 124 and interface to application 130.

User movement detection engine 116, motion analyzer engine 124 and interface to application 130 may be configured to interface with a handwriting or free-from drawing application. In one embodiment, device 106 can display handwriting application display 132. In this embodiment, handwriting application display 132 presents an image of the user 134. Here, the images of the user are of the user's face 136. (This may serve to protect the user's privacy by reminding him/her that images are being taken.) Handwriting application display 132 also presents a handwriting area 138. This area 138 shows the user pictured in image 134 creating a text character 140 via body motions. In this case, the character is of the letter "A". This image 134 is typically updated in real time via webcam 104. This permits the user to monitor the character strokes he/she is creating while moving a desired feature (e.g., face, arms, etc.). In other embodiments, area 138 can be overlapped with image 134 so the user can monitor his/her movement along with the strokes created all in one area on the display. Furthermore, other embodiments may not include area 138 at all.

Figure 2:
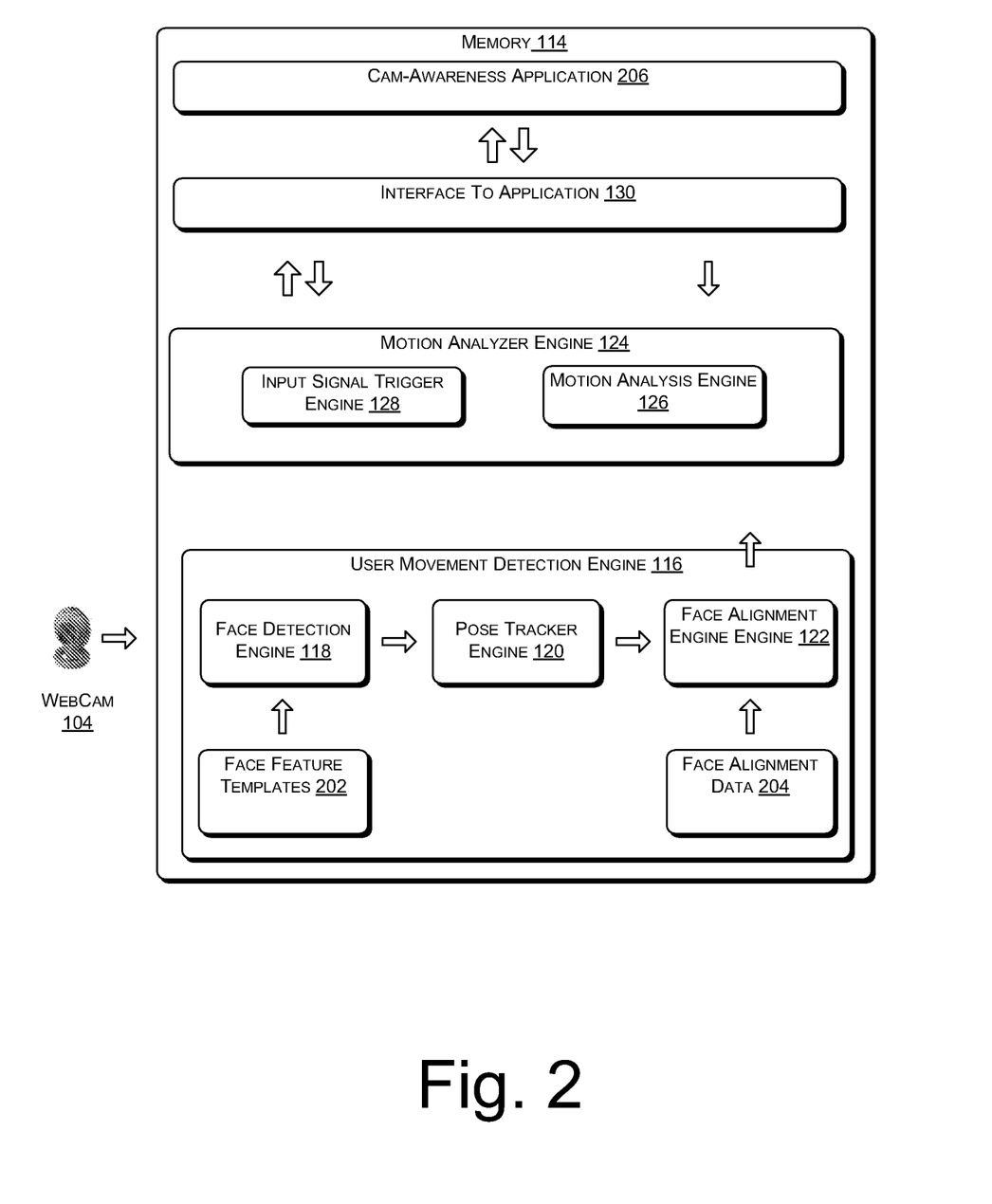
FIG. 2 depicts exemplary engines involved in inputting data via a webcam or other input device.

FIG. 2 illustrates one embodiment of detecting and processing user movement data via memory 114 in device 106. First, the user's feature(s) (e.g. face and facial features) is brought into view of webcam 104. This information (in the form of video frames) is sent to the user movement detection engine 116 on device 106. In one embodiment, user movement detection engine 116 first routes the data to the face detection engine 118. This engine detects a user feature such as a face in a webcam image. Face feature templates 202 can also be used to aid face detection engine 118.

If there is a face or other body part in the image, the initial position, pose, size and orientation of the face and/or facial features or other body part characteristics are determined by pose tracker engine 120. Specifically, pose tracker engine 120 tracks the 3-dimensional pose of a user feature such as the pan, tilt and the roll of a face. In order to accomplish this, multiple points are assigned to specific facial features such as eyes, nose and mouth. These points are used to determine the initial position, pose, size and orientation of the face and/or facial features or other body part characteristics. Typically, detection and tracking is done without using CamSpace technology. In other words, this is done without requiring a user to hold a colored solid object.

The data from pose tracker engine 120 is then passed on to face alignment engine 122. This engine serves to determine 2-dimensional user features such as an eye corner, mouth corner or even non-facial features. The data from face alignment engine 122 is typically a set of user feature points such as facial feature points. Face alignment data 204 can also aid alignment engine 122 in this task.

In some instances, there is also a face track component available to aid in rescaling raw webcam image data for tracking and recording tracked face information.

In one embodiment, face detection engine 118 and face alignment engine 122 only operate on the first frame of video which is used to give an initial reference to the other engines such as pose tracker engine 120. This serves to conserve computational resources.

After processing via user movement detection engine 116 is completed, the data is then passed to motion analyzer engine 124. In one embodiment, motion analyzer engine 124 routes the data to motion analysis engine 126. This engine records the position, size and orientation of the user's motion over a plurality of webcam frames. This engine also aids in eliminating errors of face detection. Additionally, the engine also analyzes which user feature(s) is moving, such as moving a hand, bending an arm or opening a mouth according to the webcam's sequential frames. The engine also serves to break down the composited/complex motions of the user into sequential simple motions. For instance, if a user creates a "zig-zag" with a hand-this engine will break down the motion into 3 steps: (1) movement horizontal; (2) movement slantwise; and (3) movement horizontal.

The data is then passed to input signal trigger engine 128. Input signal trigger engine 128 will convert the sequential simple motions recognized by motion analysis engine 126 into composited/complex motions. The engine will then send signals of the composited/complex motions to application 130 which is in communication with an external application (a cam-awareness application 206). Signals are sent to the cam-awareness application if a user executes a pre-determined motion and is detected by motion analyzer engine 124 and user movement detection engine 116.

In one embodiment, a user can set thresholds between modules. For instance, in FIG. 2 double arrows indicate thresholds set between motion analyzer engine 124 and interface to application 130. Another threshold is shown between interface to application 130 and cam-awareness application 206. The thresholds trigger modules based on user decisions. In one embodiment, a threshold is the distance between an upper lip and a lower lip in which an "open mouth" is determined. In another embodiment, a user can set the threshold so that "head shakings" are not captured.

External applications can be a word processing application, handwriting application, drawing application, network browser, instant messaging client, video application, interactive advertising, games, control remote applications and/or many other applications. For example, in one non-limiting embodiment, user movement detection engine 116 is configured to interface with a video display application. Via user movement detection engine, a user can issue the command for the video application to fast forward through a movie merely by opening his/her mouth. The user can resume regular video play by closing his/her mouth.

Many other user motions can be used to serve as input to external applications. For instance, selection of files displayed on a computer display can be done by gesturing to the webcam with a certain number of fingers. For instance, if icon numbers 1-5 are displayed on a computer screen, a user only has to raise three fingers to select the third icon. Confirmation of a "yes" or "no" question can be done by nodding a head (which indicates "no") or shaking a head up and down (which indicates "yes"). Zooming in on a screen can be done by gesturing one's hands apart in view of a webcam. Selection of an icon can be done simply by blinking one's eyes. Navigating down a video game hallway can be done by leaning one's head toward the desired direction of travel. A user input to undue an action may also be trigged by a user frowning and turning his/her head up and away from the display. In other embodiments, the webcam may detect the user move his/her head in other directions in relation to the webcam and predetermined actions may be executed in response. Many other gestures can be associated to external programs. Combinations of user features can also be used. For instance, head and facial gestures can be combined with hand gestures to create the desired input signals to external applications.

Illustrative Processes

Figure 3A:
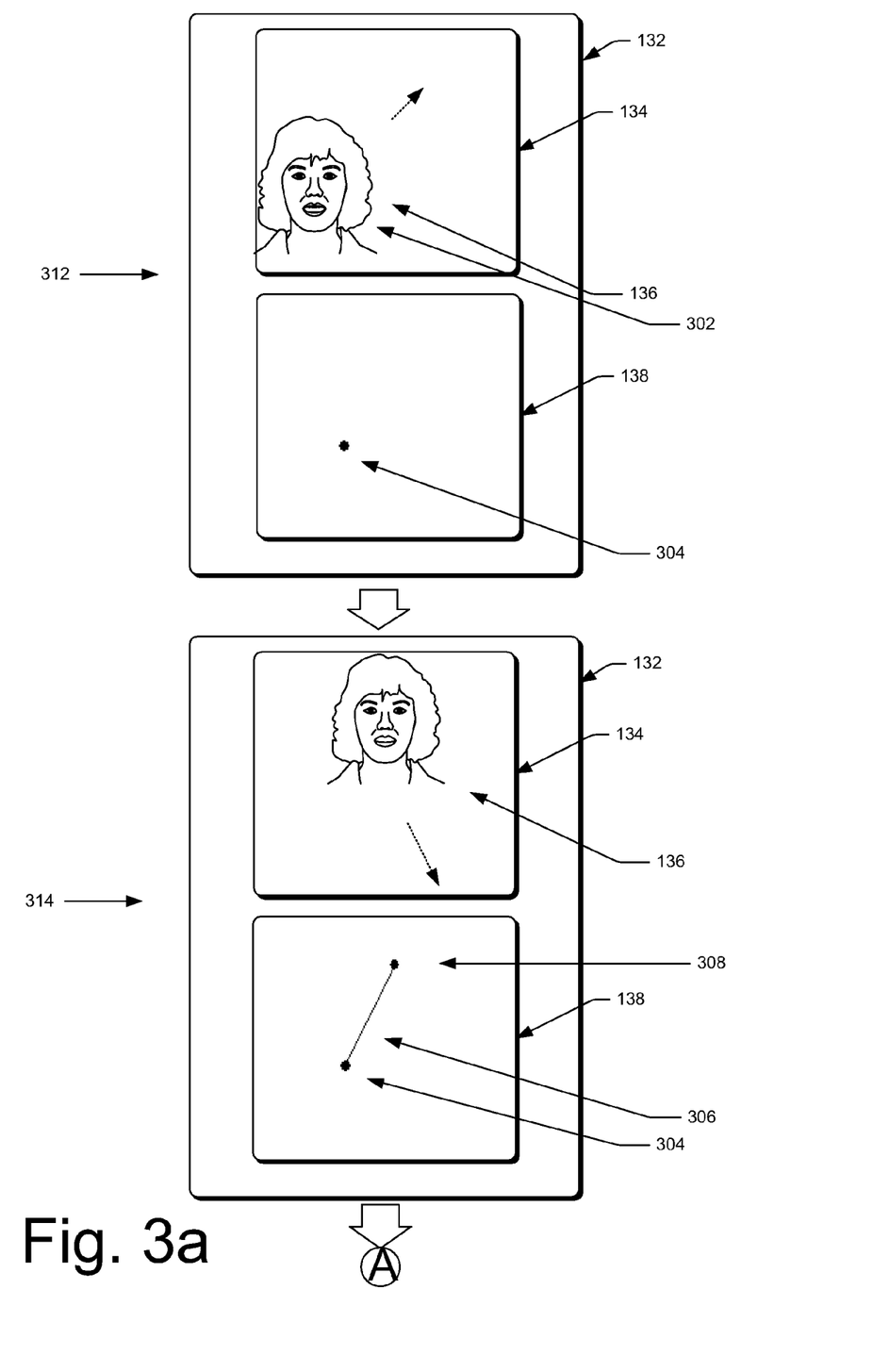
FIGS. 3a, 3b and 3c depict an illustrative process for creation of a text character via a user moving her head and mouth in view of a webcam. While these figures depict creation of a text character, it is to be appreciated that the described techniques may apply equally to any other type of user input, as described throughout.
Figure 3B:
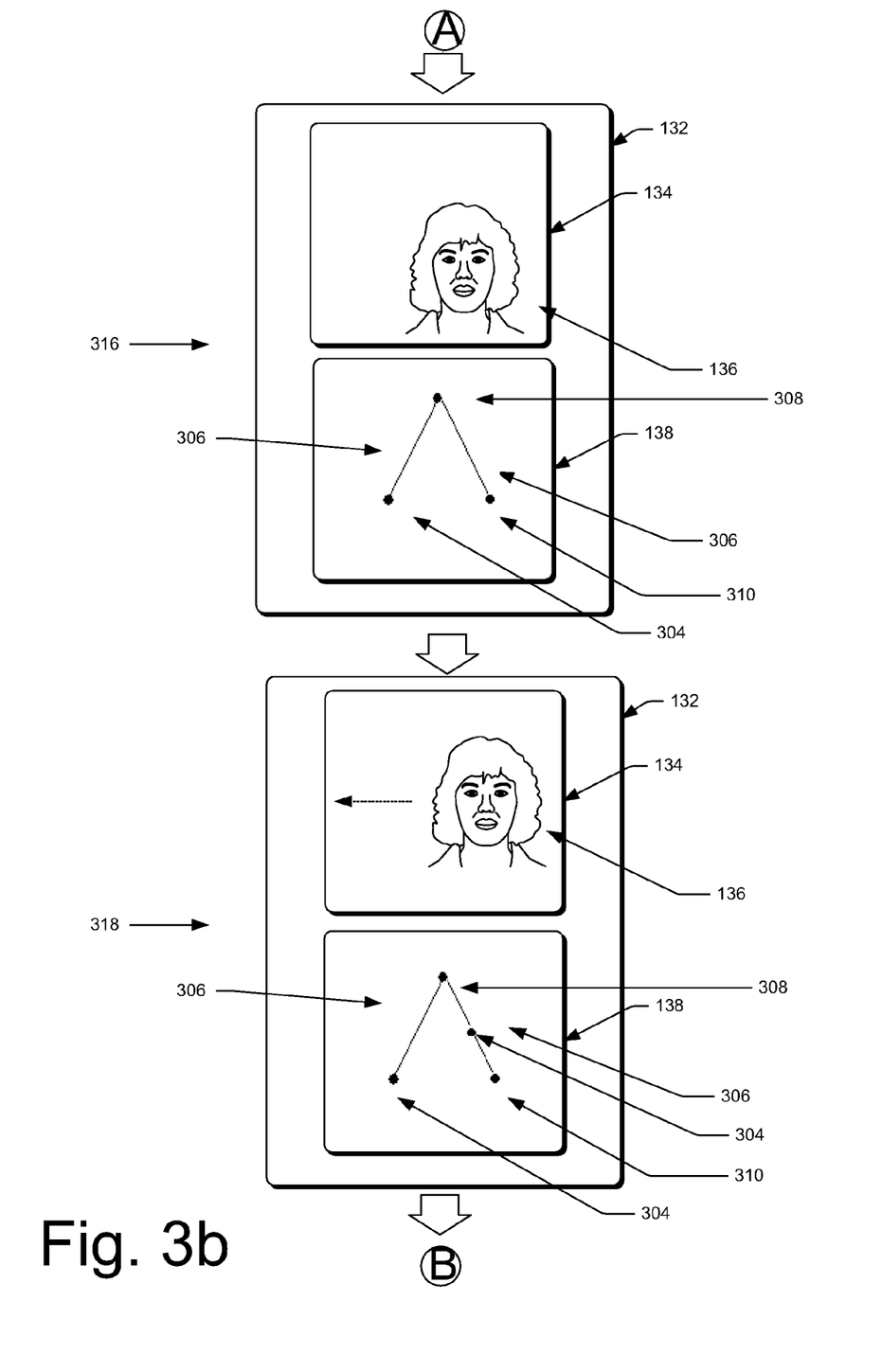
Figure 3C:
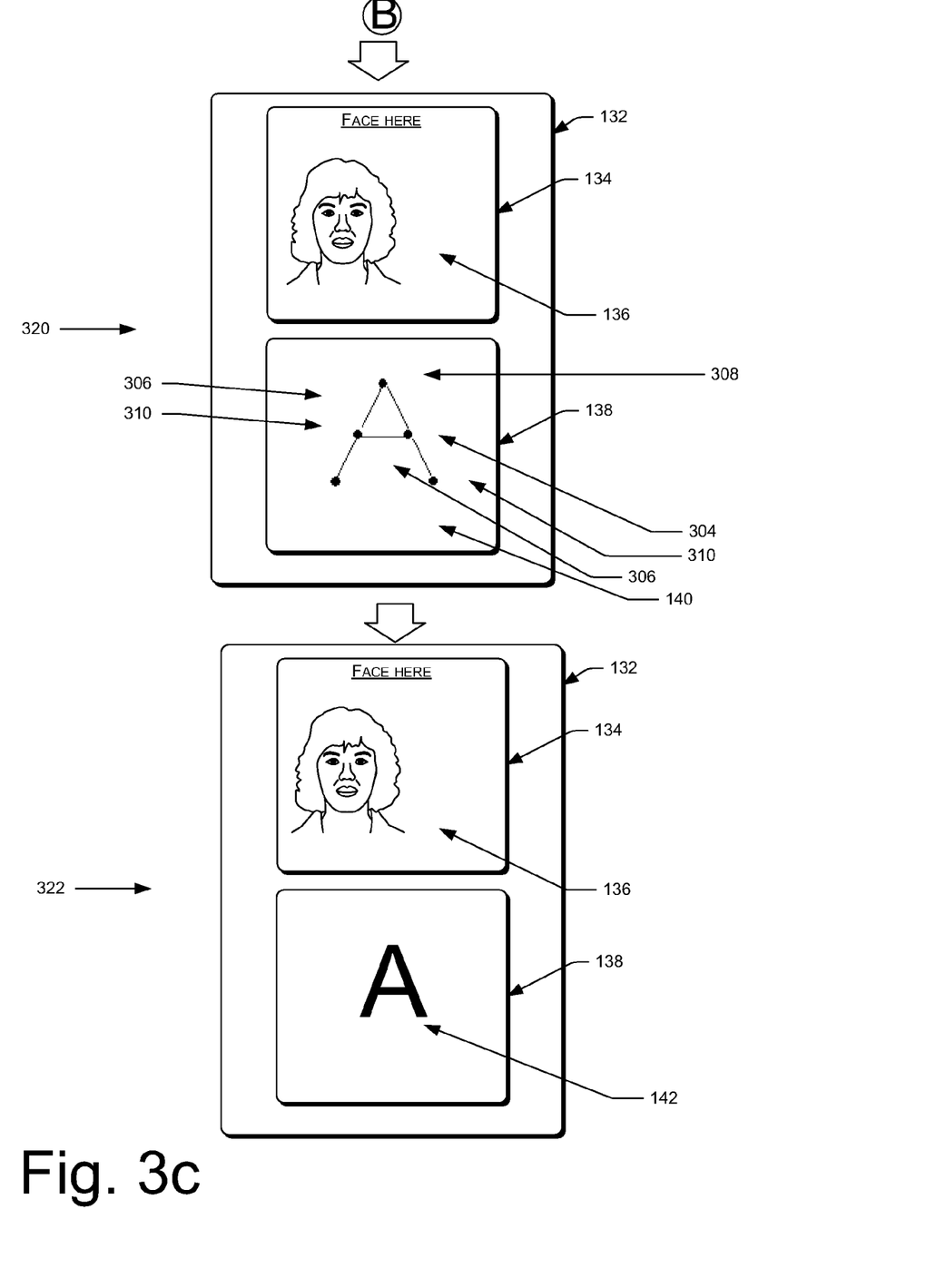

FIG. 3*a*-FIG. 3*c* further illustrate the process of creating a text character 300 by illustrating an embodiment in which a user creates the strokes necessary to create the text character, "A". Again, this example is merely illustrative, and the described techniques may be used to implement any number of inputs by detection of any number of user features. As illustrated in FIG. 2, user movement detection engine 116 and motion analyzer engine 124 are used to detect the face, its features and analyze motions. Reference will be made to user movement detection engine 116 and motion analyzer engine 124 generally. See above for specifics regarding engines residing inside these engines.

First, a user comes into view of webcam 104 at operation 312. The user's image may be updated in real time and displayed to his or herself via image of user 134 on device 106. (For purposes of demonstration, the user starts in FIG. 3*a* as displayed in the lower left hand side of the display in preparation to write the character "A"). In one embodiment, the user's movement, in image 134 can be displayed in a mirror image orientation.

The first image frame of the user is transmitted by the webcam to user movement detection engine 116. Initially in this embodiment, this engine typically detects the user's face, facial features (such as a mouth), the position of the face and features and also their orientation and alignment via face detection engine 118, pose tracker engine 120 and face alignment engine 122. Other attributes of the user and/or other users (such as hand gestures) can be similarly processed simultaneously by user movement detection engine 116.

As discussed above, both a user's face and facial features are detected. The face and facial feature position, orientation and alignment are also detected over a plurality of webcam frames in this embodiment via motion analyzer engine 124. A person's face 136 with a closed open mouth is initially detected. In one embodiment, a cursor is displayed in area 138 that moves according to the user's head. The user would move the cursor to the desired starting point by moving her head to the desired position. In FIG. 3*a*, the user places her head to her lower left (initial position 302) in order to create a start point in the lower left of area 138.

The user then opens his/her open mouth to signal to the external application to create a stroke starting point 304 as shown in FIG. 3*a*. The stroke starting point will serve as a starting point for the text character 140 "A". The user would typically keep his/her mouth open after creating the stroke starting point in the current example.

The user (while keeping the mouth open) then moves the head diagonally to his/her upper right. This creates stroke extension 306 at operation 314. Stroke point 308 may also be created. In one embodiment, this may be a stroke end point if the user closes his/her mouth. In another embodiment, the user can keep his/her mouth open and continue the stroke in a different direction without creating stroke point 308. The user creates another stroke extension 306 by moving to his/her lower left in a substantially diagonal motion. This creates the two diagonal lines of the text character "A" at operation 316. Here, a user creates stroke end point 310 which terminates the stroke by closing her mouth.

The user would then create a stroke extension 306 which is the horizontal stroke of the character "A", by first creating a start point 304 (at operation 318 in FIG. 3*b*) in the middle of the right-most existing diagonal stroke extension 306 and moving her head horizontally to the left (while keeping his/her mouth open) until it intersects the left-most existing stroke extension 306 which completes the text character "A" at operation 320 in FIG. 3*c*. Here, the user closes his/her mouth which creates another stroke end point 310. The length of stroke extension 306 can also be controlled via voice command. For instance, a change in pitch can indicate a certain desired length of the stroke.

The resulting character "A" can 140 can be converted via Optical Character Recognition (OCR) by inputting the text character "A" created above into an OCR module at operation 322. This results in character 142. The OCR module would convert the strokes into a text character "A" which could be exported to a word processing program or any number of other programs.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more processor-accessible memory devices comprising processor-executable instructions that, when executed, direct a device to perform actions comprising:
    detecting a head of a user and a mouth of the user;
    detecting movement of the mouth from a first position to a second position, the first position being a closed mouth position and the second position being an open mouth position, wherein an upper lip of the mouth and a lower lip of the mouth are moved apart by at least a threshold distance;
    in response to the detecting the movement of the mouth from the first position to the second position, creating a start point of a character stroke on a display;
    detecting horizontal movement of the head;
    in response to the detecting of the horizontal movement of the head, extending the character stroke horizontally on the display;
    detecting vertical movement of the head;
    in response to the detecting of the vertical movement of the head, extending the character stroke vertically on the display;
    detecting diagonal movement of the head;
    in response to the detecting of the diagonal movement of the head, extending the character stroke diagonally on the display;
    detecting movement of the mouth from the second position to the first position;
    in response to detecting the movement of the mouth from the second position to the first position, creating an end point of the character stroke on the display;
    detecting a voice of the user; and
    in response to the detecting the voice of the user, extending a length of at least one character stroke based on the voice of the user.

2. The one or more processor-accessible memory devices of claim 1, wherein a webcam detects the movement of the mouth.

3. The one or more processor-accessible memory devices of claim 1, the actions further comprising displaying a real-time image of the user on the display.

4. The one or more processor-accessible memory devices of claim 1, the actions further comprising detecting head movement toward and away from a webcam, and in response, executing an action.

5. The one or more processor-accessible memory devices of claim 1, the actions further comprising converting the character stroke into a text character that is recognized by a word processing application via Optical Character Recognition (OCR).

6. One or more processor-accessible memory devices comprising processor-executable instructions that, when executed, direct a device to perform actions comprising:
    detecting a first body part of a user via a webcam, wherein the first body part comprises a mouth;
    detecting the user positioning the first body part in a first manner;
    in response to detecting the user positioning the first body part in the first manner, creating a start point of a stroke on a display, wherein positioning the first body part in the first manner comprises moving an upper lip of the mouth and a lower lip of the mouth apart by at least a threshold distance;
    detecting the user moving a second body part at least a threshold distance while the user holds the first body part fixed relative to the second body part;
    in response to the detecting the second body part moving at least the threshold distance and to detecting the user holding the first body part fixed relative to the second body part, extending the stroke horizontally, vertically or diagonally on the display;
    detecting the user positioning the first body part in a second manner; and
    in response to the user positioning the first body part in the second manner, creating an end point of the stroke on the display.

7. The one or more processor-accessible memory devices of claim 6, wherein the second body part comprises a head of the user.

8. The one or more processor-accessible memory devices of claim 6, wherein the second body part comprises at least one eye of the user.

9. The one or more processor-accessible memory devices of claim 6, wherein the second body part comprises at least one hand of the user.

10. The one or more processor-accessible memory devices of claim 6, wherein the second body part comprises a facial feature of the user.

11. The one or more processor-accessible memory devices of claim 6, wherein the second body part comprises at least one leg of the user.

12. The one or more processor-accessible memory devices of claim 6, the actions further comprising displaying a real-time video of the user on the display.

13. The one or more processor-accessible memory devices of claim 6, the actions further comprising detecting head movement toward and away from the webcam and, in response, executing an action.

14. One or more processor-accessible memory devices comprising processor-executable instructions that, when executed, direct a device to perform actions comprising:
    detecting an upper lip and a lower lip of a user;
    detecting the user moving the upper lip and the lower lip away from each other by at least a first threshold distance;
    in response to the detecting of the user moving the upper lip and the lower lip away from each other by at least the threshold distance, creating a start point of a stroke on a display;
    detecting the user moving a body part of the user other than the upper lip and the lower lip at least a second threshold distance while the user maintains at least the first threshold distance between the upper lip and the lower lip; and
    in response to the detecting of the body part moving at least the second threshold distance and to the user maintaining at least the first threshold distance between the upper lip and the lower lip, extending the stroke on the display.

15. The one or more processor-accessible memory devices of claim 14, wherein the body part comprises a head of the user.

16. The one or more processor-accessible memory devices of claim 14, wherein the body part comprises at least one hand of the user.

17. The one or more processor-accessible memory devices of claim 14, the actions further comprising displaying a real-time video of the user on the display.

18. The one or more processor-accessible memory devices of claim 14, the actions further comprising detecting head movement toward and away from a webcam that detects movement of the user and, in response, executing an action.

19. The one or more processor-accessible memory devices of claim 14, the actions further comprising converting a stroke into a text character that is recognized by a word processing application via Optical Character Recognition (OCR).

* * * * *